(12) United States Patent
Grogg et al.

(10) Patent No.: US 8,474,349 B2
(45) Date of Patent: Jul. 2, 2013

(54) IDLE-ABLE AUXILIARY DRIVE SYSTEM

(75) Inventors: John Allen Grogg, LaOtto, IN (US); Mark James Shewchuck, Charlotte, MI (US)

(73) Assignee: Eaton Corporation, Cleveland, OH (US)

(*) Notice: Subject to any disclaimer, the term of this patent is extended or adjusted under 35 U.S.C. 154(b) by 756 days.

(21) Appl. No.: 12/629,424

(22) Filed: Dec. 2, 2009

(65) Prior Publication Data
US 2010/0147644 A1   Jun. 17, 2010

Related U.S. Application Data

(60) Provisional application No. 61/122,861, filed on Dec. 16, 2008.

(51) Int. Cl.
*B60K 17/34* (2006.01)
*F16D 25/08* (2006.01)
*F16D 25/10* (2006.01)

(52) U.S. Cl.
USPC .............. 74/665 GB; 74/665 T; 192/48.5; 192/48.604; 192/53.1; 192/110 B (58) Field of Classification Search
USPC ............ 192/48.603, 48.618, 85.49, 85.53, 192/110 B, 48.5, 48.604; 74/665 G, 665 GB, 74/665 T
See application file for complete search history.

(56) References Cited

U.S. PATENT DOCUMENTS

| 4,317,512 | A  | * | 3/1982  | Sato .......................... 192/85.5 |
| 4,785,926 | A  | * | 11/1988 | Matson ...................... 192/18 A |
| 5,125,876 | A  |   | 6/1992  | Hirota |
| 5,172,787 | A  | * | 12/1992 | Kobayashi ................... 180/197 |
| 5,799,748 | A  |   | 9/1998  | Origuchi |
| 7,497,312 | B2 | * | 3/2009  | Braford, Jr. .............. 192/48.603 |
| 2006/0249346 | A1 | * | 11/2006 | Ebenhoch et al. .......... 192/53.1 |
| 2008/0230295 | A1 |   | 9/2008  | Grogg |

FOREIGN PATENT DOCUMENTS

WO   WO 2008/115963 A1   9/2008

OTHER PUBLICATIONS

International Search Report and Written Opinion of the International Searching Authority, mailed Jul. 6, 2010, PCT/IB2009/007762 filed Dec. 15, 2009, p. 1-11.

Hughs, D., Wydick, K., "Minimizing the Fuel Economy Impact of AWD", SAE 2008 All Wheel Drive Vehicle Symposium, Aug. 21, 2008, pp. 1-15.

* cited by examiner

*Primary Examiner* — Richard M. Lorence
(74) *Attorney, Agent, or Firm* — Mei & Mark LLP (57) ABSTRACT

A power transfer unit (PTU) for a motive device includes an outer housing and a torque transferring clutch. The PTU also includes a piston housing located between the outer housing and the torque transferring clutch, and a piston in the piston housing. The piston is arranged to provide actuation forces to the torque transferring clutch, and to restrict reaction forces back to the piston housing.

20 Claims, 6 Drawing Sheets

IDLE-ABLE AUXILIARY DRIVE SYSTEM

CROSS-REFERENCE TO RELATED APPLICATION

This non-provisional patent application claims priority under 35 USC §119(e) to U.S. provisional patent application Ser. No. 61/122,861, filed Dec. 16, 2008, the disclosure of which is incorporated herein by reference.

TECHNICAL FIELD

The present disclosure relates generally to automotive vehicle drivelines that can convert between drive systems using two out of four wheels and all four wheels. More specifically, the present disclosure relates to a power transfer unit that assists with this conversion and the design and placement of a piston within the power transfer unit that enables efficient packaging into a vehicle driveline.

BACKGROUND

Current all wheel drive (AWD) vehicle drivelines may comprise a primary front drive axle coupled to a secondary auxiliary rear drive system. The secondary auxiliary rear drive system typically includes a power transfer unit, a drive shaft, an AWD coupling device, a rear axle, and rear half shaft assemblies. When the vehicle is operating in a 4×2 mode, the front primary axle provides tractive forces to keep the vehicle moving, and to overcome the driveline efficiency losses of the secondary drive axle that is being driven through the tire/road surface interface. The driveline efficiency losses are largely due to oil churning losses, viscous drag, inertia, and friction.

To provide a more fuel efficient driveline for operating in 4×2 mode, it is desirable to have the ability to completely "idle" the secondary auxiliary drive system by disconnecting the secondary auxiliary drive system from the primary drive system and allowing the secondary auxiliary drive system to rotationally coast to a stop. Idling the secondary auxiliary drive system in this manner would remove virtually all of the driveline efficiency losses from the secondary auxiliary drive system with the exception of its non-rotating inertia.

SUMMARY

In one embodiment, a power transfer unit (PTU) for a motive device includes an outer housing and a torque transferring clutch. The PTU also includes a piston housing located between the outer housing and the torque transferring clutch, and a piston in the piston housing. The piston is arranged to provide actuation forces to the torque transferring clutch, and to restrict reaction forces back to the piston housing.

In another embodiment, a torque transferring system may comprise a motor for supplying torque, a transmission operatively coupled to the motor, a primary drive axle operatively coupled to the transmission, and a power transfer unit operatively coupled to the primary drive axle. The power transfer unit may comprise an outer housing. The outer housing may surround a piston in a piston housing, first coupling members selectively operatively coupled to the piston, a torque transferring clutch selectively operatively coupled to the first coupling members, and second coupling members selectively operatively coupled to the torque transferring clutch. A pinion gear may operatively couple to the second coupling members. A drive shaft may operatively couple to the pinion gear. A secondary drive axle may operatively couple to the drive shaft.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

Reference will now be made in detail to the present exemplary embodiments, examples of which are illustrated in the accompanying drawings. Wherever possible, the same reference numbers will be used throughout the drawings to refer to the same or like parts.

Figure 1:
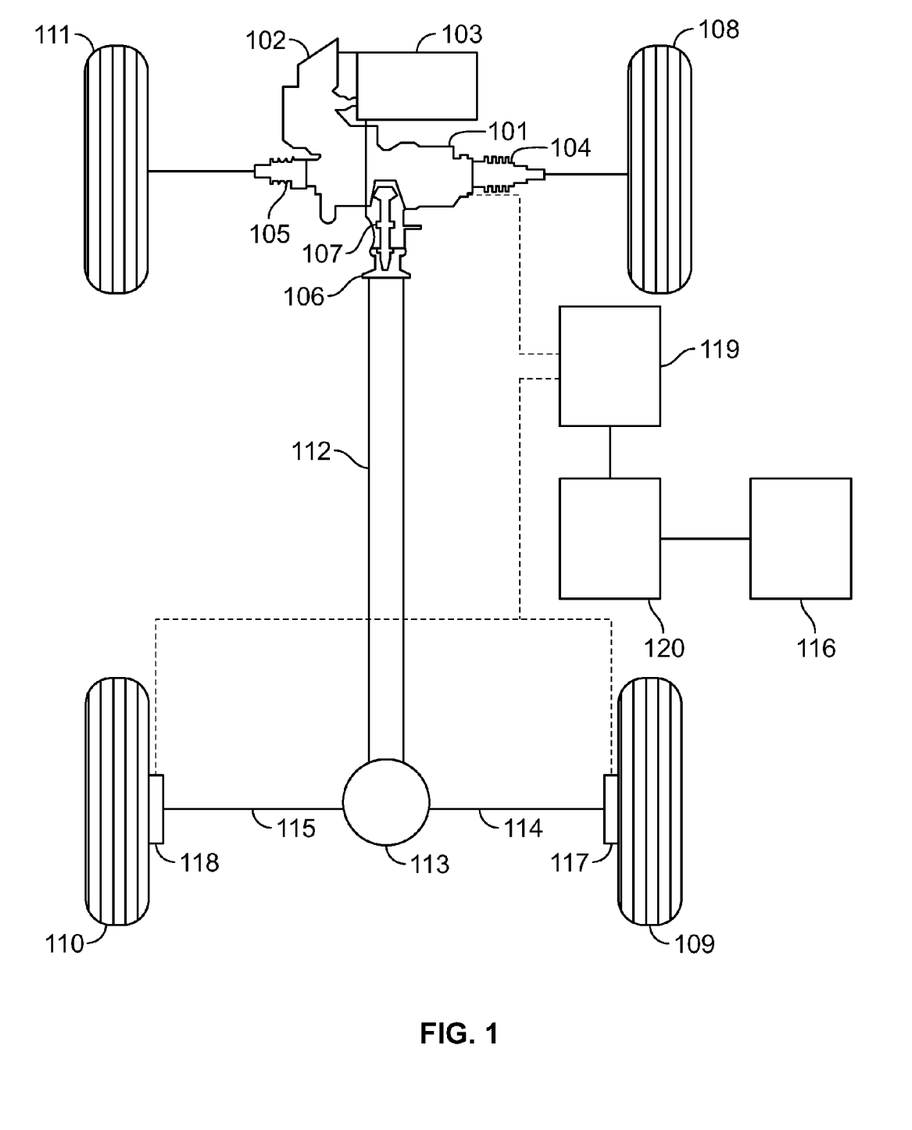
FIG. 1 is an example of a vehicle driveline having an idle-able PTU.

FIG. 1 shows one example of a front wheel drive vehicle driveline system for use in, for example, an automobile. The driveline comprises four wheels: first wheel 108, second wheel 109, third wheel 110, and fourth wheel 111. The front wheels, first wheel 108 and fourth wheel 111, provide tractive forces for 4×2 mode, which is a mode where rear wheels, second wheel 109 and third wheel 110, do not receive torque from the engine. In 4×4 mode, front and rear wheels receive torque from the engine to provide tractive forces for the vehicle.

Wheels 111 and 108 are part of a front axle, which comprises first and second constant velocity joint and output half shaft assemblies 104 and 105, primary drive front transaxle 102, and idle-able power transfer unit (PTU) 101. Primary drive front transaxle 102 is in mechanical communication with engine 103 and PTU 101, which may be bolted to the transaxle 102. PTU 101 is in mechanical communication with pinion gear 107, which is coupled via companion flange 106 to drive shaft 112. Drive shaft 112 is further coupled to rear drive axle 113, which is connected to first rear half shaft 114 and second rear half shaft 115. First rear half shaft 114 is coupled to first wheel hub disconnect 117, which is connected to second wheel 109. Second rear half shaft 115 is coupled to second wheel hub disconnect 118, which is coupled to third wheel 110.

The primary drive system of the vehicle may comprise engine 103, primary drive front transaxle 102, first and second constant velocity joint and output half shaft assemblies 104 and 105 and output half shaft 204. The secondary auxiliary drive system may comprise PTU 101, pinion gear 107, companion flange 106, drive shaft 112, rear drive axle 113, first rear half shaft 114, and second rear half shaft 115. The secondary auxiliary drive system can completely and non-rotationally idle while the vehicle is operating in a 4×2 mode and then re-engage the drive system for operation in a 4×4 mode across all operating speeds, including highway operating speeds.

Torque transfers from the engine to a transmission within the primary drive front transaxle 102 and then to a front drive differential case. The front drive differential case can divide torque between a front driving differential gear set and PTU 101. The two front half shafts transfer torque to first wheel 108 and fourth wheel 111. PTU 101 transfers torque, through features described below, to drive shaft 112 then rear drive axle 113, where it is divided between first rear half shaft 114 and second rear half shaft 115. Appropriate amounts of torque are transferred to second wheel 109 and third wheel 110 through, respectively, first wheel hub disconnect 117 and second wheel hub disconnect 118.

An electronic control unit ("ECU") 120 processes data from sensors 116, which are connected to various locations along the driveline to determine the appropriate distribution of torque to each of the vehicle wheels. The amount of torque may be the same for each of first wheel 108, second wheel 109, third wheel 110, and fourth wheel 111, or the amount of torque to each wheel may vary in response to traction, stability, braking, steering angle, driveline speed, acceleration, yaw, throttle position, or other vehicle conditions.

Figure 2A:
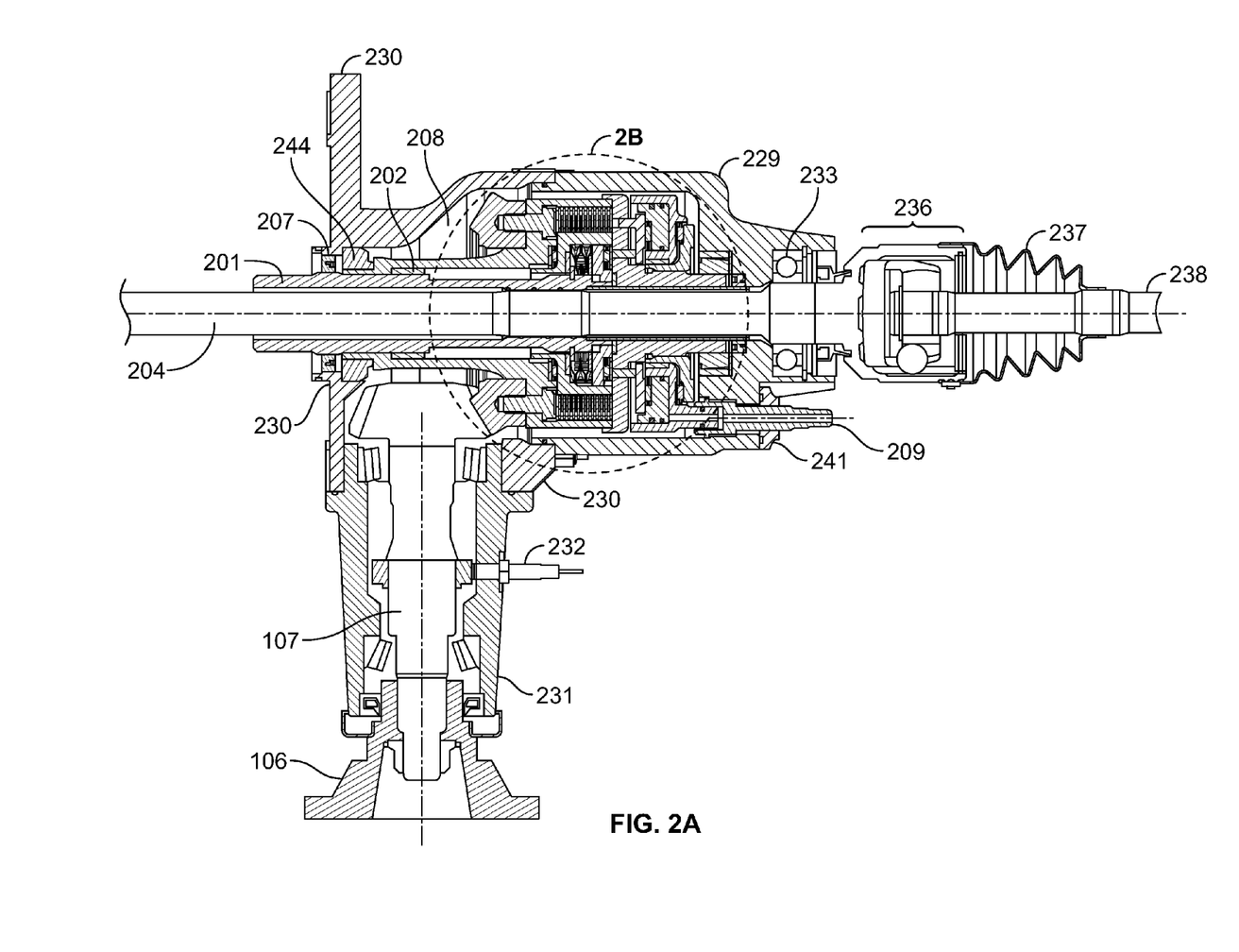
FIG. 2A is an example of a PTU with a non-rotating piston and non-rotating piston housing.

Various sensors and communications 116 provide data for processing within an electronic control unit 120. ECU 120 can determine appropriate amounts of torque for transfer to second wheel 109 and third wheel 110. In addition, ECU 120 can control when first wheel hub disconnect 117 and second wheel hub disconnect 118 should connect or disconnect second wheel 109 and third wheel 110 from respective first rear half shaft 114 and second rear half shaft 115. The connection and disconnection is facilitated by actuation from a hydraulic control unit ("HCU") 119, as will be further discussed below. HCU 119 also assists with actuation of a piston 211, as shown in FIG. 2, within PTU 101. ECU 120 may also determine when HCU 119 should actuate piston 211. A skilled artisan will recognize the arrangement of sensors and communications 116, the arrangement and operation of ECU 120, and the connection means to and from HCU 119.

Figure 2B:
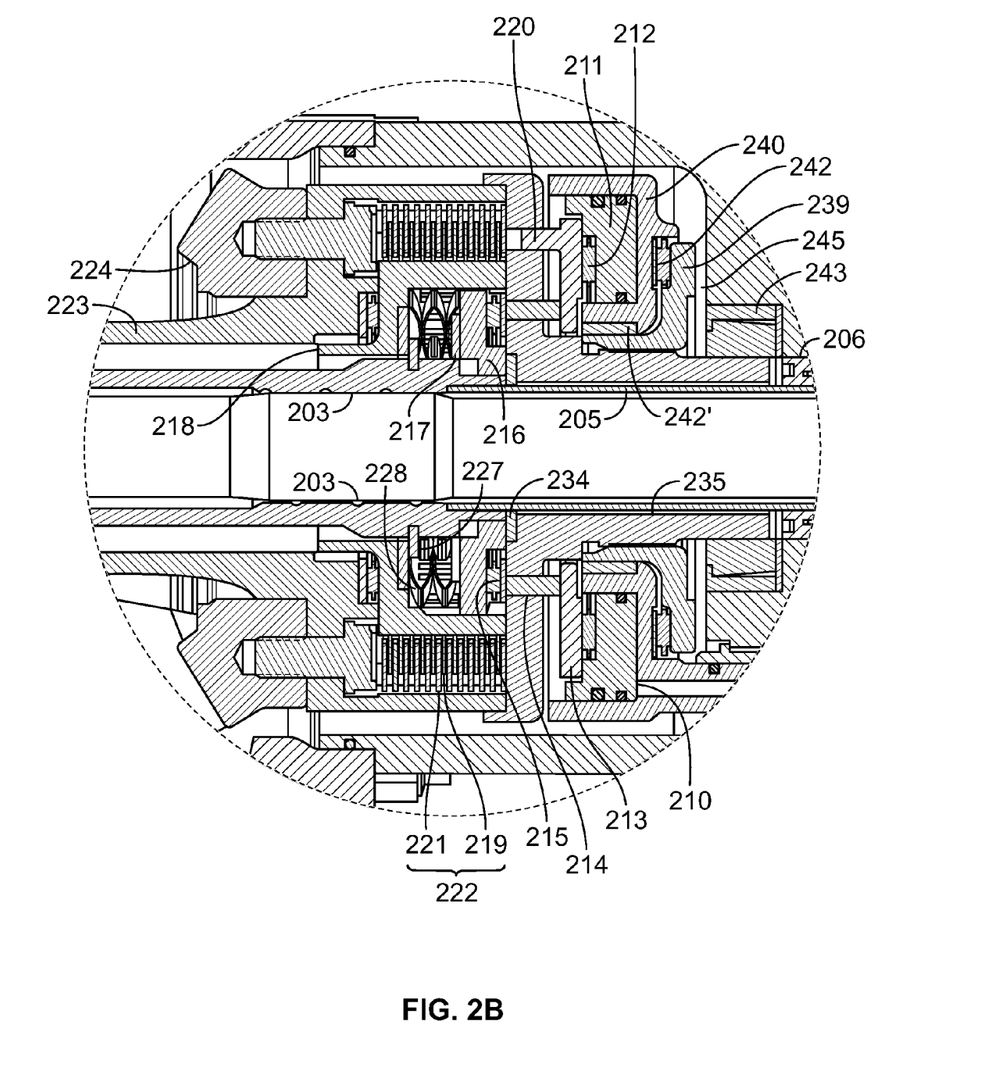
FIG. 2B is an enlargement of a section of the PTU of FIG. 2A.

FIGS. 2A and 2B show one embodiment of an inventive idle-able PTU. FIG. 2A is an enlargement of PTU 101 of FIG. 1, and FIG. 2B is an enlargement of a section of the PTU of FIG. 2A.

PTU 101 includes a torque transferring clutch in series with actuation members. In the embodiment shown, the torque transferring clutch is a wet clutch in series with a synchronized dog clutch. The torque transferring clutch may comprise a coupling member 218, inner friction discs 219, and outer friction discs 221. The torque transferring clutch may comprise a multi-plate wet clutch pack 222. The dog clutch may comprise a dog collar with wet clutch features. In addition, actuation members may comprise, for example, slave piston 213, inner pins 214, outer pins 220, second needle thrust bearing 215, friction disc 217, and dog collar 216.

PTU 101 includes a housing that may comprise PTU outer housing cap 229 and PTU outer housing 230. PTU outer housing cap 229 also houses PTU oil volume area 208 and interfaces with roller bearing assembly 233. PTU outer housing 230 interfaces with PTU pinion housing 231. PTU pinion housing 231 houses pinion gear 107 and interfaces with at least one speed sensor 232.

As discussed above, torque is divided between the front driving differential (not shown) and PTU 101. PTU 101 receives torque via a hollow shaft 201 that is in direct connection between the front driving differential case and the input of a disconnectable hydraulically actuated multi-plate clutch in clutch pack 222. The clutch pack 222 is an example of a wet clutch, which is a lubricated clutch that can be selectively compressed to cause the plates to grip one another. The amount of grip engagement, or stiffness, of the plates correlates to the amount of torque transferred by the plates. The stiffness of the multi-plate clutch limits the torque transferred through a right angle gear set, comprised pinion gear 107 and ring gear 224. The right angle gear set drives drive shaft 112.

When operating in a 4×2 vehicle mode, torque is supplied to hollow shaft 201 directly from the front axle differential case. Hollow shaft 201 is radially supported via needle roller bearing 202 and also at a journal bearing fit at location 203 on output half shaft 204. The hollow output half shaft 204 spins freely, not transferring torque to any other portion of PTU 101. The space between output half shaft 204 and tube feature 205 forms a volume where lubricating oil from the transaxle freely flows. Tube feature 205, roller bearing assembly 233, first lip seal 206, and second lip seal 207, respectively, to form an oil tight volume which keeps the oil from the transaxle (not shown) from mixing with the gear oil contained within PTU oil volume area 208. Output half shaft 204 connects, through roller bearing assembly 233, to constant velocity joint assembly 236 and constant velocity joint boot 237, which in turn interfaces with right hand outer output half shaft 238.

To shift the vehicle from a 4×2 mode to a 4×4 mode of operation, hydraulic control unit 119 supplies hydraulic fluid to oil port 209, which is secured to PTU outer housing cap 229 by sealing nut 241. An oil sump 245 is also formed in housing cap 229. The hydraulic fluid flows into piston chamber 210 in piston housing 240, where hydraulic pressure builds. Piston housing 240 pilots on the torque transferring clutch, but does not rotate. The pressure forces piston 211 to move axially, which creates thrust and moves first needle thrust bearing 212 and slave piston 213. The axial movement in turn forces a plurality of inner pins 214 to engage second needle thrust bearing 215, which moves axially to urge dog collar 216 to contact rotating friction surface disc 217.

Additional pressure supplied by hydraulic control unit 119 into piston housing 240 causes friction to increase between non-rotating dog collar 216 and rotating friction disc 217. The increasing pressure causes dog collar 216 to begin rotating. Coupling member 218 and inner friction discs 219 rotate with dog collar 216 through rotative spline engagement between dog collar 216 and coupling member 218, and between coupling member 218 and inner friction discs 219 of clutch pack 222.

As the rotating speed of dog collar 216 and friction disc 217 synchronizes, so does the rotating speed of dog collar 216 and hollow shaft 201. The synchronization is facilitated through the rotative engagement of friction disc 217 with hollow shaft 201.

Further increases in hydraulic pressure moves dog collar 216 axially and into mechanical rotative engagement with hollow shaft 201. Mechanical engagement occurs by mating dog clutch features on the inner radial face of dog collar 216 with corresponding dog clutch features on the outer radial face of hollow shaft 201. After the dog collar 216 and the hollow shaft 201 engage, the hollow shaft 201, dog collar 216, coupling member 218, and inner clutch discs 219 rotate together and the remainder of PTU 101 remains in idled condition.

Additional fluid pressure into piston housing 240 completes the conversion from 4×2 mode to 4×4 mode. This additional fluid pressure in piston chamber 210 of piston housing 240 causes a plurality of outer pins 220, which are connected to slave piston 213, to contact the outer friction discs 221 of clutch pack 222.

As the additional fluid pressure increases, so does the axial force exerted from outer pins 220 on clutch pack 222. As clutch pack is loaded axially, torque is transferred from coupling member 218 to flange half spool 223. Torque applied to flange half spool 223 applies torque to ring gear 224, which in turn supplies torque to pinion gear 107. Pinion gear 107 may be splined to companion flange 106, which is in turn bolted to the drive shaft 112.

Outer pin 220 is shown in FIG. 2A as integral with slave piston 213, but outer pin 220 can be separate from slave piston 213. Inner pin 214 is shown separate from outer pin 220/slave piston 213 combination, but inner pin 214 may be integral with the combination.

Synchronization across clutch pack 222 occurs progressively to transfer torque from hollow shaft 201 to drive shaft 112, rear drive axle 113, first rear half shaft 114, and second rear half shaft 115. The rotational speed of outer friction discs 221, coupling member 218, and flange half spool 223 increases until the rotational speed is synchronized with inner friction discs 219. Through this synchronization, outer friction discs 221, coupling member 218, flange half spool 223, and inner friction discs 219 are also synchronized with hollow shaft 201.

When the synchronization of inner friction discs 219 and outer friction discs 221 is within predefined limits, the rotational speed difference between the rear vehicle drive wheels, second wheel 109 and third wheel 110, and first rear half shaft 114 and second rear half shaft 115 also synchronize within predefined limits. Torque then transfers from the primary drive system to the secondary drive system and is controlled by the number of and extent of engagement of inner friction discs 219 and outer friction discs 221.

Figure 4:
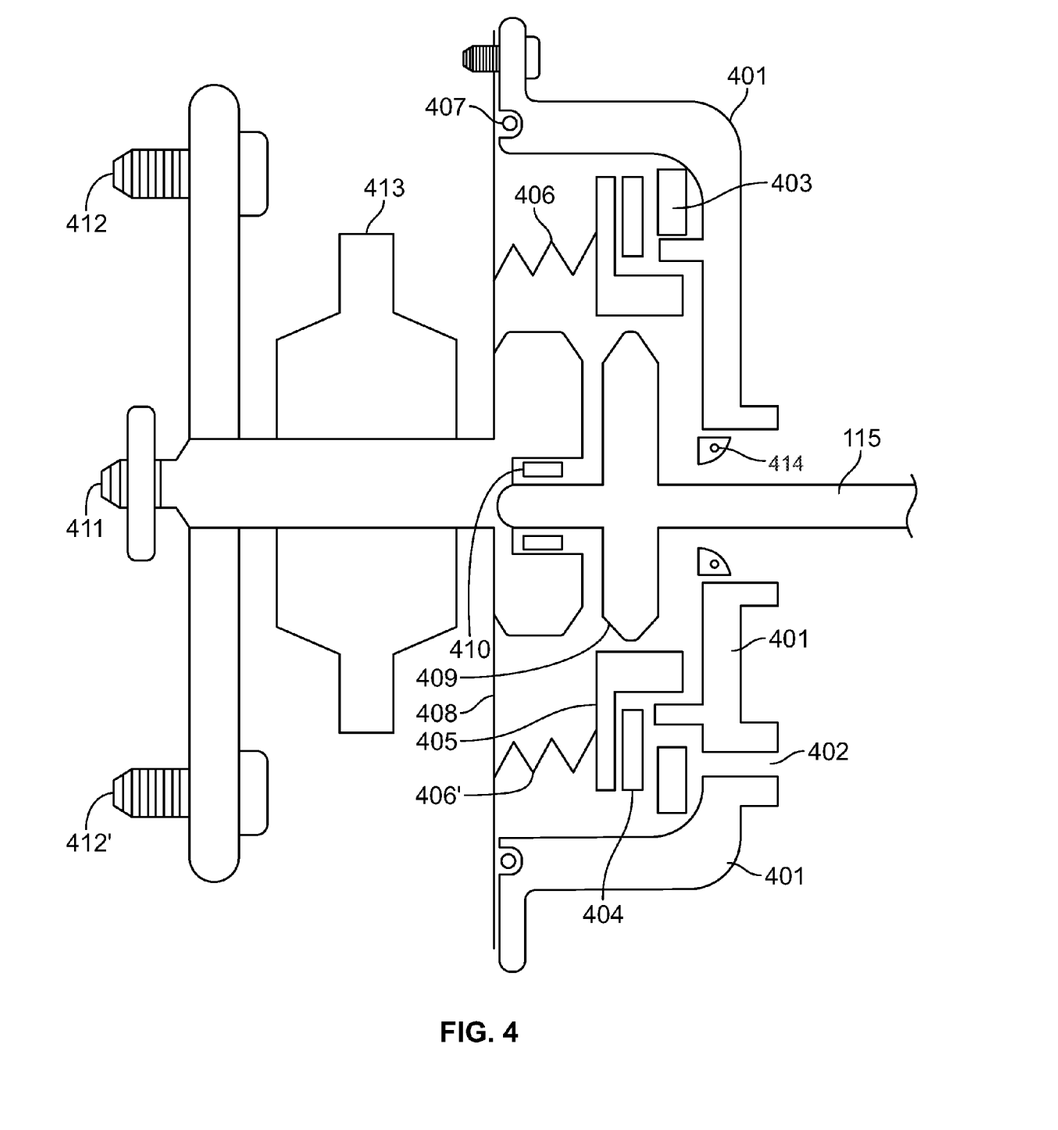
FIG. 4 is an example of a wheel hub disconnect.

With the primary drive system substantially rotationally synchronized with the secondary drive system, the rear wheels are connected to the secondary drive system. As illustrated in FIG. 4, hydraulic control unit 119 supplies hydraulic fluid to a volume bounded by seal 414 and 407 via a wheel hub hydraulic fluid input 402 for actuation of a wheel hub piston 403 at second wheel hub disconnect 118. A bearing 404 is between piston 403 and wheel hub dog collar 405. Wheel hub piston 403 causes a dog clutch arrangement at dog clutch features 409 to engage. The dog clutch features are present on wheel hub dog collar 405, output stub shaft 411, and second rear half shaft 115. A similar operation occurs at first wheel hub disconnect 117 to enable the secondary auxiliary drive system to engage the rear wheels.

Second wheel 109 and third wheel 110 convert from being driven by tire-road friction to being driven by the driveline in a 4×4 configuration. The magnitude of drive torque transferred through the secondary auxiliary drive system may be controlled by the torque transfer at clutch pack 222.

When shifting the vehicle from a 4×4 mode to a 4×2 mode of operation, and to completely idle the secondary auxiliary drive system during 4×2 mode operation, hydraulic control unit 119 reduces hydraulic pressure within piston chamber 210 to a predefined level. This allows the combined axial force of first and second bias springs 227 and 228 and clutch pack (222) compliance to create sufficient thrust to push outer pins 220 out of contact with the closest outer friction disc 221. The clutch pack compliance is a spring-like force caused by the tendency of inner friction discs 219 and outer friction discs 221 to spread apart. Ideally, both bias springs 227 and 228 unload to transfer thrust and prevent any drag. However, in some embodiments, bias springs 227 and 228 may remain slightly compressed.

The thrust transfer disengages the discs of clutch pack 222, which reduces the torque transfer through clutch pack 222 to a minimum. First bias spring 227 and second bias spring 228 axially push on inner pins 214 via dog collar 216. The pushing moves dog collar 216 out of mechanical rotational engagement with hollow shaft 201. First bias spring 227 and second bias spring 228 continue to move dog collar 216 axially until friction disc 217 is also out of contact with dog collar 216. This disconnects a front portion of the auxiliary drive system from the primary drive system.

The thrust from bias springs 227 and 228, combined with clutch pack 222 compliance, also transfers through piston 211, which pushes axially on piston housing 240. Thrust then transfers to needle roller bearing 242. Needle roller bearing 242 is comprised of a plurality of rollers which pilot in place between piston housing 240 and thrust bearing 239. Radial needle bearing 242' also comprises a plurality of rollers, which receive radial loading and radially support piston housing 240 on thrust bearing 239. Needle roller bearing 242 receives and reacts to thrust loads from piston 211. The thrust loads are transferred in to thrust bearing collar 239, which is threaded on to cap half spool 235 which abuts shim 234. Shim 234 braces the motion of hollow shaft 201. Thrust bearing 239 and cap half spool 235 rotate together. Axial thrust from piston 211, clutch pack compliance, and bias springs 227 and 228 is contained between cap half spool 235 and flange half side spool taper roller bearing 244, with the majority of the axial thrust remaining within the torque transferring clutch. Optimally, no axial thrust is transferred to flange half side spool taper roller bearing 244. Axial thrust transfer to cap half side spool taper roller bearing 243 is eliminated. Any thrust forces received at cap half side spool taper roller bearing 243 are from the gear set at pinion gear 107, The thrust loading of the needle roller bearing 242 and piston housing 240 can create an axial force, which can react back to the disc case of clutch pack 222. The reaction force caused by the thrust loading remains in the torque transferring clutch.

This departs from the conventional drive system, which does not include needle roller bearings or a piston housing. In order to accommodate thrust loads from the torque transferring clutch, the conventional drive system would require stronger, larger and more costly taper roller bearings for an output half shaft and a flange half side spool. This would increase the packaging of the conventional drive system.

The embodiment of FIGS. 2A and 2B allows for a smaller and less costly cap half side spool taper roller bearing 243 and flange half side spool taper roller bearing 244. The use of piston housing 240 also improves the packaging of PTU 101 by reducing a housing size requirement for the accommodation of taper roller bearings. The reduced housing size requirement allows pinion gear 107 to be mounted closer axially to the interface between pinion gear 107 and primary drive front transaxle 102. This design allows for additional improvements to packaging capabilities on vehicle drivelines.

The use of non-rotating piston housing 240 also moves the piston 211 location inboard from cap half side spool taper roller bearing 243, thereby allowing the use of a larger outer diameter sized cap half side spool taper roller bearing 243. This arrangement reduces the overall axial package of PTU 101 and improves the packaging of PTU 101 into vehicle platforms.

Moving the location of non-rotating piston housing 240 inboard from a cap half side spool taper roller bearing 243 has an additional benefit, because the change in location may accommodate a larger inner diameter sized cap half side spool taper roller bearing 243.

The radial design freedom on the inner and outer diameters of the cap half side spool taper roller bearing 243 benefits both a sealing tube feature 205 and the output half shaft 204. The sealing tube feature 205 and the output half shaft 204 can have enhanced sectional modulus to handle additional torque and fatigue, when compared to the conventional drive system. The enhancements benefit the longevity of both the idle-able auxiliary drive system and the primary drive system of a vehicle.

Also, when shifting from 4×4 mode to 4×2 mode, the auxiliary drive system fully disconnects from both rear drive wheels, second wheel 109 and third wheel 110 when HCU 119 reduces hydraulic pressure to wheel hub piston 403. The rear drive wheels are disconnected after the multiplate clutch pack 222 is unloaded to reduce torque going to the secondary auxiliary drive system and the synchronized dog clutch at dog collar 216 is disengaged. After the rear wheels are disconnected at first and second wheel hub disconnects 117 and 118, hydraulic pressure in piston housing 240 is reduced to facilitate the disconnection of the PTU from hollow shaft 201.

FIG. 4 shows an embodiment of second wheel hub disconnect 118 for disconnecting third wheel 110 from the auxiliary drive system. When PTU 101 transfers a minimum of torque onto the auxiliary driveline, the hydraulic pressure to the first wheel hub disconnect 117 and the second wheel hub disconnect 118 is reduced to a minimum level. A hydraulic fluid input 402 in wheel hub disconnect housing 401 is connected to HCU 119 to achieve the pressure reduction. Bias springs 406 and 406' located between knuckle 408 and wheel hub dog collar 405 cause dog clutch features 409 on each of an output stub shaft 411, second rear half shaft 115, and wheel hub dog collar 405 to disengage. This disconnects the rotational connection between the second rear half-shaft 115 and third wheel 110, which is attached via wheel lugs 412 and 412' to output stub shaft 411 and needle bearing 410, output stub shaft 411 being surrounded by wheel hub bearing 413. A similar operation also occurs on first rear half-shaft 114.

With the secondary auxiliary drive system fully disconnected from the primary drive system of the vehicle, and the rear wheels fully disconnected from the secondary auxiliary drive system, the secondary auxiliary drive system coasts to a non-rotational stop. The secondary auxiliary drive system is then in an idled condition, and the fuel economy of the driveline increases.

Figure 3:
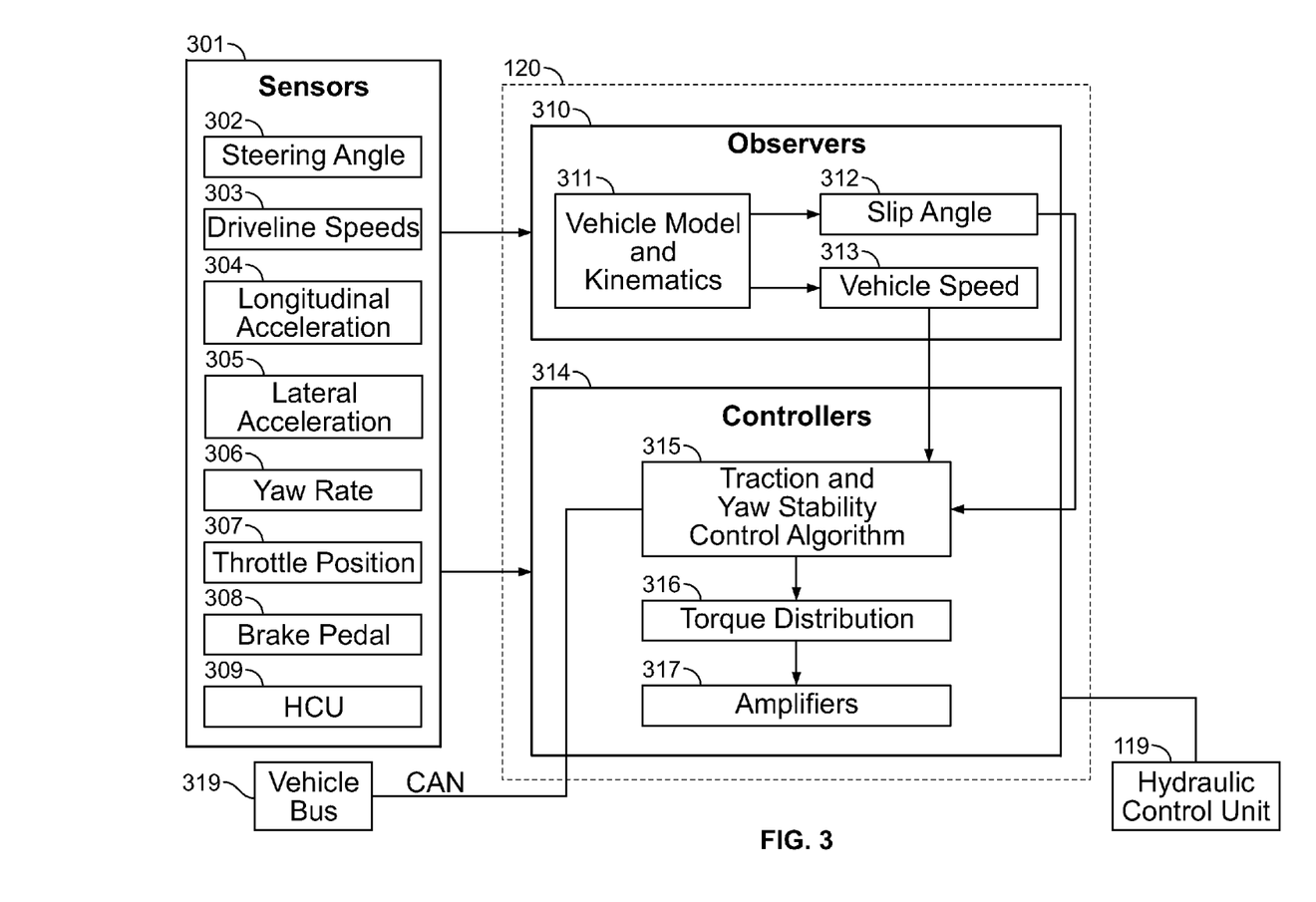
FIG. 3 is an example of an electronic control unit (ECU).

FIG. 3 shows an exemplary schematic for an electronic control unit (ECU) system. The ECU system comprises sensors 301, ECU 120, HCU 119, and vehicle bus 319 with associated controller area network (CAN). Sensors 301 collect data for use in observers 310 and controller 314 of ECU 120. The sensors may comprise one or more of a steering angle sensor 302, driveline speed sensor 303, longitudinal acceleration sensor 304, lateral acceleration sensor 305, yaw rate sensor 306, throttle position sensor 307, brake pedal sensor 308, and hydraulic control unit sensor 309. The sensors shown in FIG. 3 are exemplary only, and the idle-able auxiliary drive system can operate with additional sensors in the system and may also operate with fewer sensors than those shown, as will be understood by one skilled in the art. For example, additional sensors may be associated with vehicle bus 319 and may be dedicated or undedicated to sending data to ECU 120. The additional sensor data can be supplied to traction and yaw stability control algorithm controller 315. In an additional embodiment, additional sensor data from vehicle bus 319 can be distributed by CAN to vehicle model and kinematics observer 311 for additional processing.

The sensors 301 forward data to the ECU 120, which may comprise at least one processor with an associated memory and stored algorithms. The processor may be part of a computer system or on-board chip system. The processor of the ECU 120 may comprise one or more observers 310, which may comprise a vehicle model and kinematics observer 311. The vehicle model and kinematics observer 311 processes the data from sensors 301 according to programmed algorithms and creates data related to a slip angle 312 and vehicle speed 313. Additional data can also be created by vehicle model and kinematics observer 311, such as bank angle or roll angle data.

The slip angle 312 and vehicle speed 313 data is shared with controller 314, which also collects data from sensors 301. Controller 314 may be a part of the processor of the ECU 120 having observers 310, or controller 314 may be an additional processor with associated memory and stored algorithms which cooperate with the processor having observers 310. A traction and yaw stability control algorithm controller 315 is used to make determinations based upon at least one of the slip angle 312 data, vehicle speed 313 data, sensors 301 data, additional sensors, and additional data. Based on the results of the determinations made by the traction and yaw stability control algorithm controller 315, commands are sent from the controller via the bidirectional CAN to a vehicle bus 319 for implementation by various vehicle actuators at various locations along the vehicle drive train. The location and function of the vehicle actuators are not shown, but are within the knowledge of one of ordinary skill in the art. The commands from the controller relate to various electronically controlled stability features associated with the vehicle, including but not limited to traction control, anti-lock braking, oversteering control, limited slip differential control, and rollover control.

Results from traction and yaw stability control algorithm controller 315 are also forwarded to torque distribution controller 316 and amplifiers 317. Torque distribution controller 316 helps determine how much torque to transfer from the primary drive system to the secondary auxiliary drive system. Commands from torque distribution controller 316 are forwarded to amplifiers 317 for creation of actuation currents for transmission to HUC 119. HCU 119 interfaces with the vehicle system to provide hydraulic fluid pressure control as commanded, as described in more detail below.

The combination of sensors 301, ECU 120, and HCU 119 allows synchronization of moving parts along the drive train. When hydraulic pressure is increased in PTU 101, it urges dog collar 216 to engage between hollow shaft 201 and an input spline collar on clutch pack 222, causing only a clutch spline collar and inner friction discs 219 to rotate at the same speed as the front driving differential. The pressure within PTU 101 can be further increased, causing torque to begin being transferred through multi-plate wet clutch pack 222 in a controlled manner. This results in increasing rotational speed of the secondary auxiliary drive system until its speed matches, or synchronizes, with that of the front drive differential. The ECU system of FIG. 3 assists with the matching or synchronization. The ECU system further assists with the synchronous operation of the wheel hub disconnects so that torque is transferred smoothly from the front drive differential, through clutch pack 222, to each rear wheel. The ECU system can determine the extent and timing of mechanical engagement of the various disclosed coupling members of the drive train. The ECU system also assists with the extent and timing of disengagement of the various disclosed coupling members of the drive train for idling of the secondary auxiliary drive system.

Figure 5:
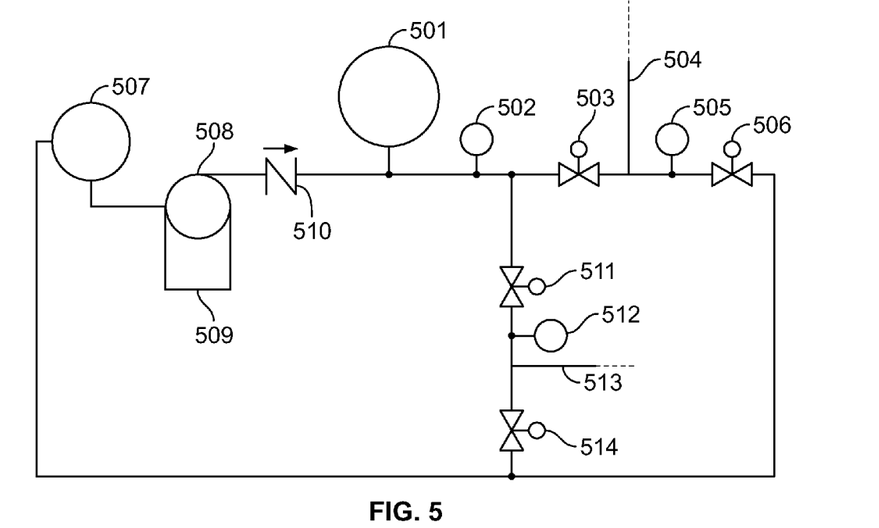
FIG. 5 is a schematic of an exemplary hydraulic control unit (HCU).

FIG. 5 shows an example of a hydraulic control unit architecture that may be used with the disclosed idle-able auxiliary drive system. The architecture includes several pressure regulating valves ("PRV"). Hydraulic fluid accumulates in an accumulator 501 and passes a first pressure sensor 502. Fluid then interfaces with first normally shut PRV 503. When fluid pressure is desired in piston chamber 210, first normally shut PRV 503 opens while first normally open PRV 506 shuts to supply fluid at oil port 209 of PTU 101. Fluid is then supplied to power transfer unit supply line 504, which interfaces with oil port 209.

When pressure is no longer needed at piston chamber 210, or a desired amount of pressure has been achieved, first normally shut PRV 503 returns to a shut position. A second pressure sensor 505 lies between PTU supply line 504 and first normally open PRV 506 and senses pressure between first normally shut PRV 503 and first normally open PRV 506. First normally open PRV 506 closes when a pressure increase is needed to actuate piston 211 and re-opens when hydraulic pressure on piston 211 is no longer needed. First normally shut PRV 503 and first normally open PRV 506 can be selectively opened and closed to obtain a desired pressure in non-rotative piston housing 210 of PTU 101. The open and shut conditions can be selected by controllers 314 of ECU 120.

Hydraulic fluid from accumulator 501 is also supplied to second normally shut PRV 511. When increased fluid pressure is desired at first wheel hub disconnect 117 and second wheel hub disconnect 118, second normally shut PRV 511 opens while second normally open PRV 514 shuts. Fluid then passes through third pressure sensor 512 and is supplied to wheel hub disconnect supply line 513 to further distribute to first wheel hub disconnect 117 and second wheel hub disconnect 118. Wheel hub disconnect supply line 513 interfaces with a hydraulic fluid input port 402 of each of the wheel hub disconnects. Second normally open PRV 514 may shut to build fluid pressure at first wheel hub disconnect 117 and second wheel hub disconnect 118. The open and shut conditions of second normally open PRV 514 and second normally shut PRV 511 may be selected by controllers 314 of ECU 120 to control the actuation of respective wheel hub piston 403 of first and second wheel hub disconnects 117 and 118. First, second, and third pressure sensors 502, 505, and 512 may supply data to ECU 120 to assist with regulation of pressure supplied to piston 211 and wheel hub piston 403.

Once hydraulic fluid is used in PTU 101, first wheel hub disconnect 117, and second wheel hub disconnect 118, the fluid returns to sump 507 and is redistributed to the system through pump 508 with associated electric motor 509. Check valve 510 prevents backflow of fluid from accumulator 501 to pump 508.

Figure 6:
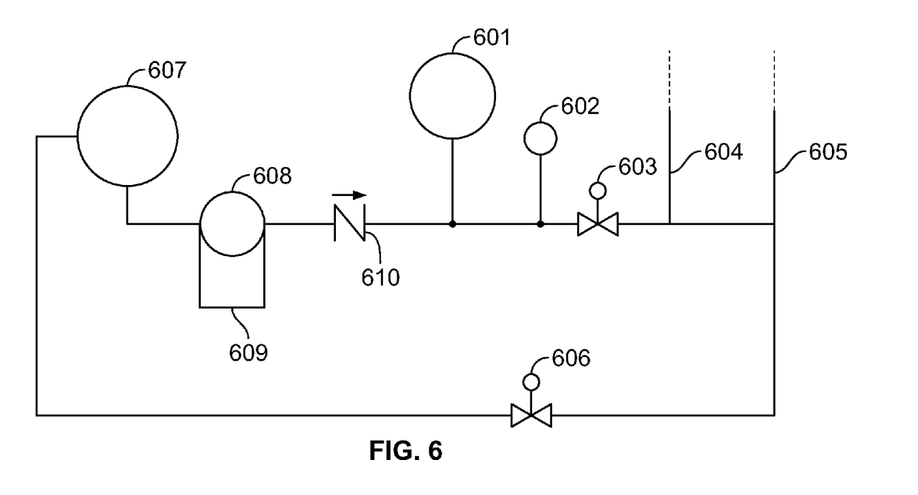
FIG. 6 is an alternative schematic of an exemplary HCU.

FIG. 6 shows a second example of a hydraulic control unit architecture. Hydraulic fluid accumulates in accumulator 601 and passes pressure sensor 602 before reaching normally shut PRV 603, which opens when fluid pressure is needed on supply line 604 to PTU 101 and supply line 605 to wheel hub disconnects 117 and 118. Normally open PRV 606 may shut when pressure is needed on supply line 604 to PTU 101 and supply line 605 to wheel hub disconnects 117 and 118. The open and shut conditions of normally open PRV 606 and normally shut PRV 603 may be selected by controllers 314 of ECU 120 in order to control the actuation of piston 211 and wheel hub piston 403 of a wheel hub disconnect. Pressure sensor 602 collects pressure data for processing by ECU 120 for controlling the pressure of hydraulic fluid to piston 211 and wheel hub piston 403.

After hydraulic fluid is used in PTU 101, first wheel hub disconnect 117, and second wheel hub disconnect 118, it returns to sump 607 and is redistributed to the system through pump 608 with associated electric motor 609. Check valve 610 prevents backflow of fluid from accumulator 601 to pump 608.

In the preceding specification, various preferred embodiments have been described with reference to the accompanying drawings. It will, however, be evident that various other modifications and changes may be made thereto, and additional embodiments may be implemented, without departing from the broader scope of the invention as set forth in the claims that follow. The specification and drawings are accordingly to be regarded in an illustrative rather than restrictive sense.

For instance, other motive devices having at least one primary drive axle coupled to a secondary auxiliary drive system can benefit from the improved packaging of the disclosed PTU. The other motive devices can have a number of wheels other than four. As another example, other hydraulic control systems can be used in place of the hydraulic control units shown in FIGS. 5 and 6.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

We claim:

1. A power transfer unit for a motive device, comprising:
an outer housing;
a torque transferring clutch;
a piston housing located between the outer housing and the torque transferring clutch;
a piston in the piston housing;
a collar located between the outer housing and the piston housing; and
a bearing located between the collar and the piston housing.

2. The power transfer unit of claim 1, wherein the bearing is a radial needle bearing.

3. The power transfer unit of claim 1, wherein the bearing is a needle roller bearing.

4. The power transfer unit of claim 1, further comprising a second bearing located between the collar and the piston housing.

5. The power transfer unit of claim 4, wherein the bearing is a needle roller bearing and the second bearing is a radial needle bearing.

6. The power transfer unit of claim 5, further comprising a needle thrust bearing between the piston and the torque transferring clutch.

7. The power transfer unit of claim 4, further comprising a third bearing located in the piston housing between the piston and the torque transferring clutch.

8. The power transfer unit of claim 1, further comprising actuation members, wherein the actuation members are located between the torque transferring clutch and the piston.

9. The power transfer unit of claim 1, wherein the torque transferring clutch comprises a synchronizing wet clutch in series with a dog clutch.

10. The power transfer unit of claim 1, further comprising a needle thrust bearing between the piston and the torque transferring clutch.

11. The power transfer unit of claim 1, further comprising a flange half side spool taper roller bearing, and an output half shaft side taper roller bearing, wherein:
the bearing is a needle roller bearing,
the torque transferring clutch is configured to transmit thrust to the needle roller bearing, the piston, the piston housing, and the collar,
the torque transferring clutch is configured to receive a reaction force back from the piston in response to the transmitted thrust, and
the output half shaft side taper roller bearing and the flange half side spool taper roller bearing are configured to receive no transmitted thrust from the torque transferring clutch.

12. A power transfer unit for a motive device, comprising:
an outer housing;
a torque transferring clutch configured to rotate in the outer housing;
a piston housing located between the outer housing and the torque transferring clutch;
a piston in the piston housing; and
a bearing in the piston housing between the piston and the torque transferring clutch,
wherein the piston housing does not abut the outer housing, and
wherein, when the torque transferring clutch rotates, the piston pilots on the torque transferring clutch but does not rotate.

13. The power transfer unit of claim 12, wherein the bearing is a needle thrust bearing.

14. A torque transferring system comprising:
a motor for supplying torque;
a transmission operatively coupled to the motor;
a primary drive axle operatively coupled to the transmission;
a power transfer unit operatively coupled to the primary drive axle, the power transfer unit comprising:
an outer housing,
a pressure-activated torque transferring clutch,
a piston housing located between the outer housing and the torque transferring clutch;
a piston in the piston housing;
a collar located between the outer housing and the piston housing;
a bearing located between the collar and the piston housing;
first coupling members selectively operatively coupled to the piston, the torque transferring clutch selectively operatively coupled to the first coupling members; and
second coupling members selectively operatively coupled to the torque transferring clutch;
a pinion gear operatively coupled to the second coupling members;
a drive shaft operatively coupled to the pinion gear; and
a secondary drive axle operatively coupled to the drive shaft,
wherein:
the piston is configured to provide variable actuation forces to the first coupling members to selectively pressure-activate the torque transferring clutch,
the torque transferring clutch is configured to transfer torque from the primary drive axle to the pinion gear by variably engaging the second coupling members in response to the variable actuation forces provided by the piston, and
torque is supplied to the secondary drive axle from the pinion gear through the drive shaft.

15. The torque transferring system of claim 14, wherein:
when the torque transferring clutch is pressure-activated, the pinion gear, the drive shaft, and the secondary drive axle transfer torque, and
when the torque transferring clutch is not pressure-activated, the pinion gear, the drive shaft, and the secondary drive axle idle.

16. The torque transferring system of claim 14, further comprising:
a hydraulic control unit for supplying hydraulic fluid to the piston housing;
a hydraulic fluid input port in the piston housing for communicating hydraulic fluid to the piston housing;
first and second rear wheels; and
first and second wheel hub disconnects, the first and second wheel hub disconnects comprising, respectively:
wheel hub pistons;
wheel hub coupling members; and
wheel hub hydraulic fluid input ports in fluid communication with the wheel hub pistons,
wherein the hydraulic control unit controls an amount of hydraulic fluid pressure for actuating the piston,
wherein the hydraulic control unit controls an amount of hydraulic fluid pressure to the wheel hub hydraulic fluid input ports for selectively activating the wheel hub pistons, and
wherein the wheel hub pistons engage the wheel hub coupling members for coupling each of the first and second rear wheels to the secondary drive axle.

17. The torque transferring system of claim 14, wherein the torque transferring clutch comprises a multi-plate wet clutch in series with a dog clutch.

18. The torque transferring system of claim 14, further comprising a second bearing located between the collar and the piston housing.

19. The torque transferring system of claim 18, further comprising a third bearing located in the piston housing between the piston and the torque transferring clutch.

20. The torque transferring system of claim 14, further comprising a second bearing located in the piston housing between the piston and the torque transferring clutch.

* * * * *